(12) United States Patent
Moilanen et al.

(10) Patent No.: US 7,021,687 B2
(45) Date of Patent: Apr. 4, 2006

(54) CLAMP ASSEMBLY

(75) Inventors: Steven M. Moilanen, Fort Wayne, IN (US); William D. Givens, Berne, IN (US); Kenneth A. Steele, Fort Wayne, IN (US); Bruce D. McIntosh, Monroeville, IN (US)

(73) Assignee: PHD, Inc., Fort Wayne, IN (US)

( * ) Notice: Subject to any disclaimer, the term of this patent is extended or adjusted under 35 U.S.C. 154(b) by 51 days.

(21) Appl. No.: 10/162,242

(22) Filed: Jun. 4, 2002

(65) Prior Publication Data
US 2003/0222469 A1   Dec. 4, 2003

Related U.S. Application Data

(60) Continuation-in-part of application No. 10/015,130, filed on Dec. 11, 2001, now Pat. No. 6,575,512, which is a continuation of application No. 09/893,849, filed on Jun. 28, 2001, now Pat. No. 6,425,616, which is a continuation of application No. 09/767,527, filed on Jan. 23, 2001, now abandoned, which is a continuation of application No. 09/483,792, filed on Jan. 14, 2000, now Pat. No. 6,176,533, which is a division of application No. 08/981,863, filed on Aug. 4, 1998, now Pat. No. 6,048,013.

(60) Provisional application No. 60/296,057, filed on Jun. 5, 2001.

(51) Int. Cl.
*B25J 15/08* (2006.01)

(52) U.S. Cl. .................. 294/116; 294/88; 294/104; 269/32; 269/258

(58) Field of Classification Search ............... 294/88, 294/115, 116, 902, 104, 106; 901/37, 39; 269/32, 34, 258
See application file for complete search history.

(56) References Cited

U.S. PATENT DOCUMENTS

| | | | |
|---|---|---|---|
| 229,670 A | 7/1880 | Carrick |
| 294,736 A | 3/1884 | Hyle |
| 320,436 A | 6/1885 | Hock |
| 377,114 A | 1/1888 | Pague |
| 490,150 A | 1/1893 | Low |
| 659,532 A | 10/1900 | Jordan |
| 688,230 A | 12/1901 | Isgrig et al. |
| 699,358 A | 5/1902 | Wilson |
| 746,360 A | 12/1903 | McAdams |
| 906,507 A | 12/1908 | Canedy |
| 1,468,110 A | 9/1923 | Howe |
| 1,472,566 A | 10/1923 | Oishei |
| 1,494,033 A | 5/1924 | Stevens |
| 1,543,037 A | 6/1925 | Teeter |
| 1,590,227 A | 6/1926 | Britton |
| 1,929,361 A | 10/1933 | Liljebladh |

(Continued)

FOREIGN PATENT DOCUMENTS

DE    853091    8/1952

(Continued)

OTHER PUBLICATIONS

BTM Corporation catalog page for Light-Weight, Fast Cycling, High Force Grippers, no date.

*Primary Examiner*—Dean J. Kramer
(74) *Attorney, Agent, or Firm*—Barnes & Thornburg LLP (57) ABSTRACT

An actuated workpiece clamp is provided. The clamp of this disclosure illustratively has an actuator, a linkage, a cam member, a cam pin, and at least one jaw member.

12 Claims, 8 Drawing Sheets

U.S. PATENT DOCUMENTS

| | | | |
|---|---|---|---|
| 1,929,807 A | 10/1933 | Casper | |
| 1,940,258 A | 12/1933 | Lautz | |
| 1,955,226 A | 4/1934 | Chavannes | |
| 1,986,149 A | 1/1935 | Harris | |
| 1,987,987 A | 1/1935 | Bohmbach | |
| 2,081,749 A | 5/1937 | Kritzler et al. | |
| 2,141,945 A | 12/1938 | Tweedale | |
| 2,168,988 A | 8/1939 | Hultquist | |
| 2,188,514 A | 1/1940 | Moore | |
| 2,198,623 A | 4/1940 | Kastler | |
| 2,212,156 A | 8/1940 | Erdley | |
| 2,295,051 A | 9/1942 | Roth | |
| 2,326,962 A | 8/1943 | Meier | |
| 2,381,657 A | 8/1945 | Eksergian et al. | |
| 2,452,406 A | 10/1948 | Volkery et al. | |
| 2,469,542 A | 5/1949 | Becker | |
| 2,499,136 A | 2/1950 | Edlund et al. | |
| 2,565,793 A | 8/1951 | Weismantel | |
| 2,609,113 A | 9/1952 | Huffman | |
| 2,615,682 A * | 10/1952 | Stone | 81/57.21 |
| 2,651,026 A | 9/1953 | Roth | |
| 2,724,296 A * | 11/1955 | Parrish et al. | 269/251 |
| 2,769,895 A | 11/1956 | Boord | |
| 2,776,168 A | 1/1957 | Schweda | |
| 2,791,623 A | 5/1957 | Lock et al. | |
| 2,796,787 A | 6/1957 | Aske | |
| 2,825,601 A | 3/1958 | Doty | |
| 2,853,905 A | 9/1958 | Reisacher et al. | |
| 2,858,522 A | 10/1958 | Wengen et al. | |
| 2,919,925 A | 1/1960 | Snyder et al. | |
| 2,948,172 A | 8/1960 | Sloboda et al. | |
| 3,061,357 A | 10/1962 | Wright | |
| 3,083,006 A * | 3/1963 | Debs | 269/110 |
| 3,146,982 A | 9/1964 | Budnick | |
| 3,349,927 A | 10/1967 | Blatt | |
| 3,350,132 A | 10/1967 | Ashton | |
| 3,482,830 A | 12/1969 | Sendoykas | |
| 3,519,188 A | 7/1970 | Erhardt, Jr. | |
| 3,568,959 A | 3/1971 | Blatt | |
| 3,570,835 A * | 3/1971 | McPherson | 269/32 |
| 3,613,904 A | 10/1971 | Blatt | |
| 3,630,391 A * | 12/1971 | Wilson | 414/744.8 |
| 3,635,514 A | 1/1972 | Blatt | |
| 3,664,654 A | 5/1972 | Manville | |
| 3,677,584 A | 7/1972 | Short | |
| 3,712,415 A | 1/1973 | Blatt et al. | |
| 3,759,563 A | 9/1973 | Kitamura | |
| 3,778,094 A | 12/1973 | Grolet et al. | |
| D230,826 S | 3/1974 | Menshen | |
| 3,920,295 A | 11/1975 | Speckin | |
| 3,934,915 A | 1/1976 | Humpa | |
| 3,975,068 A | 8/1976 | Speckin | |
| 4,072,236 A | 2/1978 | Nomura et al. | |
| 4,109,953 A | 8/1978 | Seymour | |
| 4,234,223 A | 11/1980 | O'Neil | |
| 4,275,872 A | 6/1981 | Mullis | |
| 4,307,864 A | 12/1981 | Benoit | |
| 4,355,922 A | 10/1982 | Sato | |
| 4,363,475 A | 12/1982 | McCarty | |
| 4,365,928 A | 12/1982 | Baily | |
| 4,382,572 A | 5/1983 | Thompson | |
| 4,403,801 A | 9/1983 | Huff et al. | |
| 4,453,755 A | 6/1984 | Blatt | |
| 4,462,581 A | 7/1984 | Mitani | |
| 4,473,249 A | 9/1984 | Valentine et al. | |
| 4,475,607 A | 10/1984 | Haney | |
| 4,480,497 A | 11/1984 | Locher | |
| 4,495,834 A | 1/1985 | Bauer et al. | |
| 4,515,336 A | 5/1985 | Fischer | |
| 4,519,279 A | 5/1985 | Ruggeri | |
| 4,529,182 A | 7/1985 | Valentine | |
| 4,596,415 A | 6/1986 | Blatt | |
| 4,610,475 A | 9/1986 | Heiserman | |
| 4,626,014 A | 12/1986 | Vredenbregt et al. | |
| 4,650,237 A | 3/1987 | Lessway | |
| 4,703,968 A | 11/1987 | LaBounty | |
| 4,708,297 A | 11/1987 | Boers | |
| D296,546 S | 7/1988 | Sachs | |
| 4,805,938 A | 2/1989 | Redmond et al. | |
| 4,821,719 A | 4/1989 | Fogarty | |
| 4,886,635 A | 12/1989 | Forster et al. | |
| 4,941,481 A | 7/1990 | Wagenknecht | |
| 4,957,318 A | 9/1990 | Blatt | |
| 5,016,850 A | 5/1991 | Plahn | |
| 5,062,756 A | 11/1991 | McArthur et al. | |
| 5,085,480 A | 2/1992 | Jackson | |
| 5,125,709 A | 6/1992 | Meier, Jr. | |
| 5,143,359 A | 9/1992 | Bush | |
| RE34,120 E | 11/1992 | Plahn | |
| 5,215,295 A * | 6/1993 | Hoover | 269/32 |
| 5,242,202 A | 9/1993 | Ettinger | |
| 5,248,177 A | 9/1993 | Jones et al. | |
| 5,261,715 A | 11/1993 | Blatt et al. | |
| 5,271,651 A | 12/1993 | Blatt et al. | |
| 5,280,981 A | 1/1994 | Schulz | |
| 5,284,375 A | 2/1994 | Land, III | |
| 5,291,914 A | 3/1994 | Bares et al. | |
| 5,299,847 A | 4/1994 | Blatt et al. | |
| 5,503,378 A | 4/1996 | Schauss et al. | |
| 5,516,173 A | 5/1996 | Sawdon | |
| 5,536,133 A | 7/1996 | Velez et al. | |
| 5,588,688 A | 12/1996 | Jacobsen et al. | |
| 5,647,625 A | 7/1997 | Sawdon | |
| 5,938,259 A | 8/1999 | Sawdon et al. | |
| 6,079,896 A * | 6/2000 | Dellach | 403/322.3 |
| 6,099,539 A | 8/2000 | Howell et al. | |
| 6,176,533 B1 | 1/2001 | Moilanen et al. | |
| 6,378,855 B1 | 4/2002 | Sawdon et al. | |
| 6,378,856 B1 | 4/2002 | Takahashi | |
| 6,435,494 B1 | 8/2002 | Takahashi et al. | |
| 6,439,560 B1 | 8/2002 | Sawada et al. | |

FOREIGN PATENT DOCUMENTS

| | | |
|---|---|---|
| DE | 27-22-689 A1 | 11/1978 |
| EP | 0 747 172 | 12/1996 |
| EP | 0857547 A1 | 8/1998 |
| EP | 0 928 663 | 7/1999 |
| EP | 1 201 369 | 5/2002 |
| WO | WO 98 15392 | 4/1998 |

* cited by examiner

CLAMP ASSEMBLY

RELATED APPLICATIONS

The present application is related to and claims priority to U.S. Provisional Patent Application, Ser. No. 60/296,057, filed on Jun. 5, 2001, entitled ARM OVER CLAMP, and in addition, is a Continuation-in-Part of U.S. patent application Ser. No. 10/015,130 ( filed on Dec. 11, 2001 ), which is a Continuation of U.S. patent application Ser. No. 09/893,849 ( filed on Jun. 28, 2001 ), which is a Continuation of U.S. patent application Ser. No. 09/767,527 (filed on Jan. 23, 2001 and abandoned in favor of U.S. patent application Ser. No. 09/893,849 ), which is a Continuation of U.S. patent application Ser. No. 09/483,792 ( filed on Jan. 14, 2000 ), now U.S. Pat. No. 6,176,533, which is a Divisional of U.S. patent application Ser. No. 08/981,863 ( filed on Aug. 4, 1998 ), now U.S. Pat. No. 6,048,013, which is related to and claims priority to United States PCT Application No. PCT/US97/17795 ( filed on Oct. 3, 1997 ) which is related to and claims priority to U.S. Provisional Patent Application Ser. No. 60/027,688 ( filed Oct. 7, 1996 ) and U.S. Provisional Patent Application Ser. No. 60/039,088 ( filed Mar. 14, 1997 ), and in addition, is a Continuation-in-Part of U.S. patent application Ser. No. 09/991,033 ( filed on Nov. 21, 2001) which is a Continuation of U.S. patent application Ser. No. 09/823,066 ( filed on Mar. 30, 2001 ), now U.S. Pat. No. 6,322,118, which is a Continuation of U.S. patent application Ser. No. 09/345,031 ( filed on Jun. 30, 1999 ), now U.S. Pat. No. 6,276,733, which is related to and claims priority to U.S. Provisional Patent Application Ser. No. 60/096,232 ( filed Jun. 30, 1998 ), the complete disclosures of all of these applications are hereby expressly incorporated into the present application.

BACKGROUND AND SUMMARY

The present application relates to fluid pressure actuated clamps of the type employed in automated workpiece handling devices which clampingly grip, and illustratively transfer a workpiece from one station to another. More particularly, the present invention relates to fluid pressure actuated enclosed clamps for gripping a workpiece.

Fluid pressure actuated grippers and clamps are widely employed and typically take the form of a pneumatic or hydraulic differential motor or actuator whose cylinder is fixedly mounted to a transfer device. Conventionally, a swing arm is coupled to the actuator and translates the movement, which is typically linear, into rotational movement. The arm is then rotatable between open and closed positions relative to another arm or clamping structure. In typical operation, the clamp jaws close on a workpiece near the edge of the same and will then advance to a work station or some other operation. The clamp will then open to release the workpiece.

Because it is known in the art that such fluid actuated clamps have complicated linear to rotational translational mechanisms, it would be beneficial to provide an actuated clamp having a simplified linear to rotational translational mechanism.

Accordingly, the following disclosure provides an actuated workpiece clamp. The clamp comprises an actuator, a body, a linkage, a cam member, a cam pin, and at least one jaw member. The body comprises a slot longitudinally-extending therein. The linkage is disposed in the slot, and is coupled to the actuator for longitudinal movement within the slot. The cam member comprises a cam track disposed therein and a pivot mounting extending therefrom. The cam pin is coupled to the linkage, and is disposed in the cam track. At least one jaw member is attached to the pivot mounting. The longitudinal movement of the linkage causes movement of the cam pin along the cam track to cause pivoting of the cam member about the pivot mounting which pivots the jaw member relative to the body.

Other illustrative embodiments of the actuated workpiece clamp may further comprise at least one jaw member being a plurality of jaw members with at least one being fixedly attached to the body; a stop that couples to the body and selectively engages the cam member to limit pivoting of same to a defined stroke; at least one jaw member being a pivot jaw member being pivotably attached to the body independent of the cam member; a housing that attaches to the body and encloses the cam member; the cam track being arcuate; the linkage being attached to a piston rod extending from the actuator; the linkage being movable longitudinally in a first plane, and the cam member being pivotable in a second plane which is spaced apart from and substantially parallel to the first plane; one jaw member which is fixedly attached to the body is attached to the housing; and the stop being variable to selectively limit the defined stroke.

Another illustrative embodiment of the actuated workpiece clamp comprises a coupling, a member, a movable body, a housing, and a jaw. The member is attached to the coupling and extends therefrom. The movable body has a slot disposed therethrough. The pivot coupling is attached to the movable body. The member engages the slot to pivot the movable body about the pivot coupling. The housing encloses the coupling, the member, and the movable body, and has an opening disposed therein to allow the pivot coupling to extend therethrough. The jaw is attached to the pivot coupling and is located exteriorly of the housing, and is movable relative to the housing.

Other illustrative embodiments of the actuated workpiece clamp may further comprise a second jaw that is fixedly attached to the movable body; a stop positioned within the housing that selectively engages the movable body to limit pivoting of same to a defined stroke; a pivot jaw pivotably attached to the housing independent of the movable body; and the coupling and member being movable longitudinally in a first plane; the movable body being pivotable in a second plane which is spaced apart from and substantially parallel to the first plane; and the slot being defined by an arcuate path.

Another illustrative embodiment of the actuated workpiece clamp comprises an actuator, a linkage, and a cam member. The actuator produces a longitudinal movement. The linkage extends transversely to and moves coincidentally with the longitudinal movement of the actuator. The cam member has a cam pathway disposed therein The linkage is disposed in the cam pathway, and the longitudinal movement of the actuator is translated into rotational movement in the cam member.

Another illustrative embodiment of the actuated workpiece clamp comprises a clamp body, an actuator, a jaw member and a jaw tip. The actuator assembly defines a longitudinal axis along which at least a portion of the assembly moves. The jaw member is coupled to the body. The jaw tip is pivotable relative to the clamp body and is pivotable transversely relative to the longitudinal axis.

Additional features and advantages of the clamp assembly will become apparent to those skilled in the art upon consideration of the following detailed description of the illustrated embodiment exemplifying the best mode of carrying out the clamp assembly as presently perceived.

BRIEF DESCRIPTION OF DRAWINGS

The present disclosure will be described hereafter with reference to the attached drawings which are given as non-limiting examples only, in which.

Corresponding reference characters indicate corresponding or analogous parts throughout the several figures. The exemplification set out herein illustrates best mode embodiments of the disclosure, however, such exemplification is not to be construed as limiting the scope of the invention in any manner.

DETAILED DESCRIPTION OF THE DRAWINGS

Figure 1:
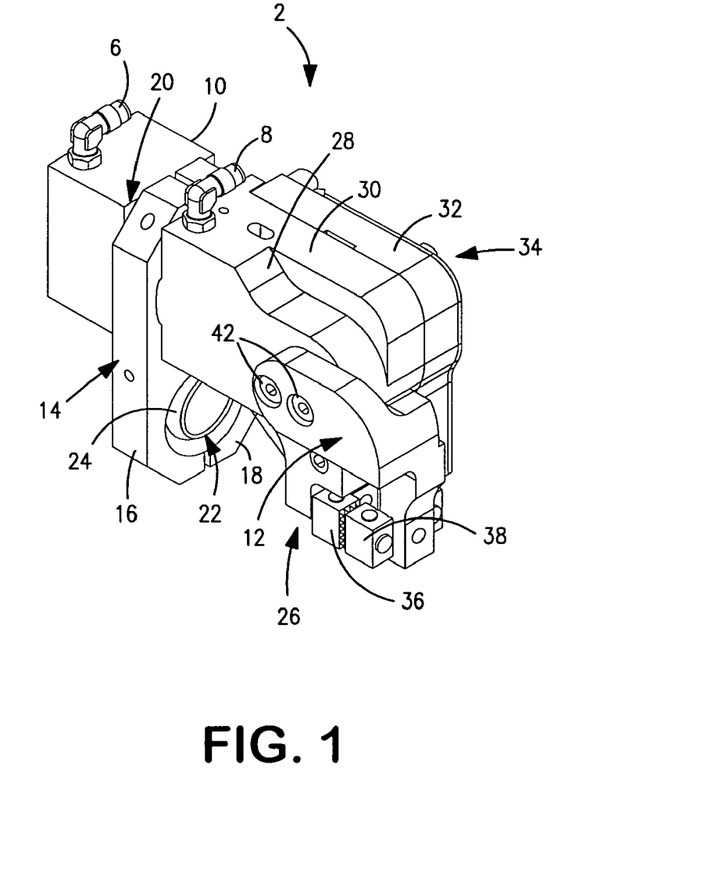
FIG. 1 is a left-forward perspective view of a fluid actuated clamp according to the present disclosure.

A forward perspective view of a fluid actuated clamp 2 is shown in FIG. 1. Clamp 2 is illustratively actuated by linear fluid actuator 4. (See also FIG. 4.) Fluid ports 6, 8 are disposed in body 10 to provide power to actuator 4. In the illustrated embodiment, the actuator is a pneumatic actuator with port 6, 8 being air extension and retraction ports. It is appreciated, however, that the actuator may be hydraulic, electrical or other power source. The power source and the actuator illustratively provide linear power that clamp 2 translates into rotational power to provide rotary motion to clamp arm assembly 12.

A mounting bracket 14 is shown in FIG. 1 for mounting clamp 2 to an articulated support or transfer device. Mounting bracket 14 illustratively comprises a plurality of plate portions 16, 18 which are secured together by screws, bolts, or other like fasteners which extend into threaded bores of each plate portion. Body 10 comprises a narrowed portion or collar 20. This collar 20 is received in an opening (not shown) in mounting bracket 14. The clamp can, thus, freely rotate with respect to the mounting bracket 14. Mounting bracket 14 further comprises an opening 22 which receives a spherical collar 24 that can be clamped therein in a selectively fixed orientation and used to mount the gripper device to an articulated structure.

Housing portions 28, 30, 32 (collectively housing 34) illustratively are part of body 10 located adjacent collar 20 distal from the actuator 4. In this illustrated embodiment, translational mechanisms (i.e., the mechanisms that translate linear motion to rotational motion) are located within housing 34, as will be discussed further herein. Arm assembly 12 is located exteriorly of housing 34 and is attached to a hub 40, which extends through housing portion 32 via fasteners 42. (See also FIG. 4.) A second clamp arm assembly 26 extends from housing 34, and comprises a tip 36 attached thereto that aligns with tip 38 of arm assembly 12 when clamp arm assemblies 12, 26 are in the closed or clamped position. These tips provide the gripping surfaces for the clamps when arm assembly 12 is in the closed or clamped position.

Figure 2:
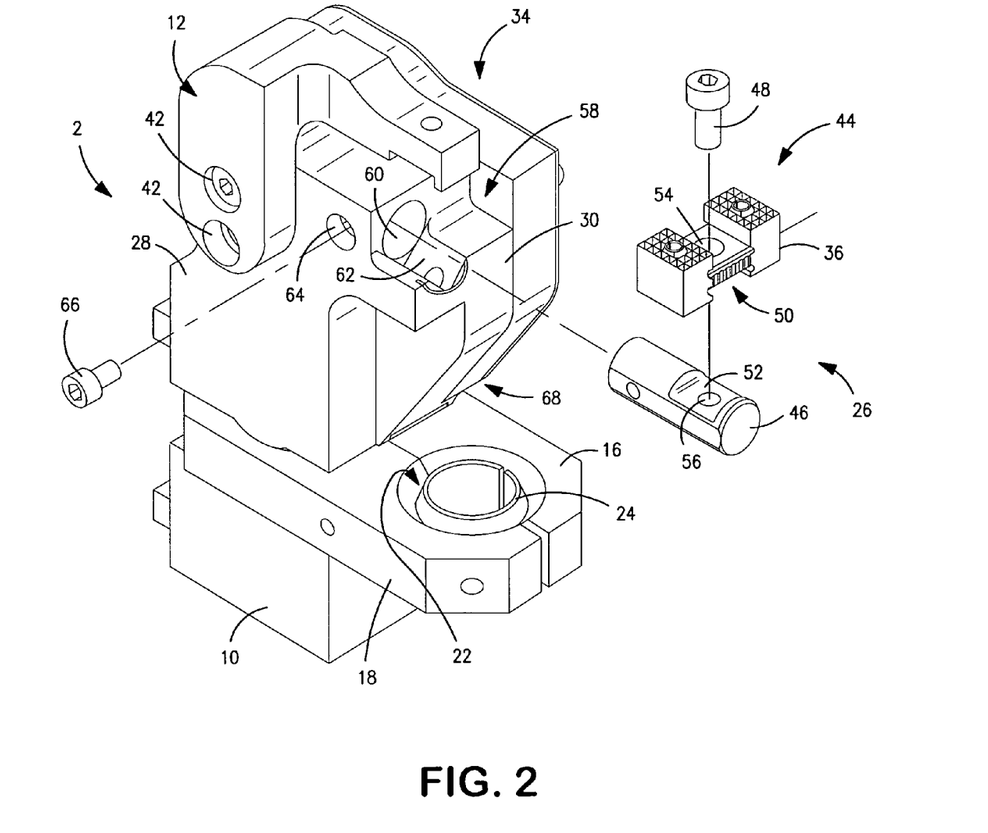
FIG. 2 is a left-upwardly perspective and partially exploded view of the fluid actuated clamp of FIG. 1.

A partially exploded view of the second fluid actuated clamp arm assembly 26 is shown in FIG. 2. This illustrated embodiment depicts a rocking lower arm assembly 44. This arm assembly 44 allows tip 36 to conform to any relative angle of the workpiece that might not be positioned parallel to tip 36 when arm assembly 12 is moved to the closed or clamped position. Assembly 44 comprises tip 36 which is attachable to pivoting arm 46 by a fastener 48. Illustratively, central body portion 50 is seated in notch 52. Notch 52 ensures consistent fit between tip 36 and pivoting arm 46. Bores 54, 56 in tip 36 and pivoting arm 46, respectively, are coaxially aligned when tip 36 is seated in notch 52. Fastener 48 extends through bores 54, 56, thereby attaching tip 36 to pivoting arm 46. Illustratively, a tip recess 58 is formed in housing portions 28, 30 of housing 34. Tip recess 58 accommodates tip 36 with tip 38 of arm assembly 12 when same is in the closed or clamped position. A bore 60 and trough 62 are formed in tip recess 58. A portion of pivoting arm 46 extends into bore 60 with the remainder seated in trough 62. A set bore 64 is disposed transversely into bore 60. A set fastener 66 is configured to extend into set bore 64, and engage pivoting arm 46 to secure same into place. It is contemplated that bore 64 may be a slot or groove so as to allow movement of arm 46 relative to clamp 2.

Also shown in FIG. 2 is the form of housing 34. Specifically, the cross section of housing 34 is reduced at 68. This allows spherical collar 24 of mounting bracket 14 to receive and attach to a mounting tube or similar structure (not shown). This reduction accommodates this portion of the mounting tube or similar structure that might require extension through spherical collar 24.

Figure 3:
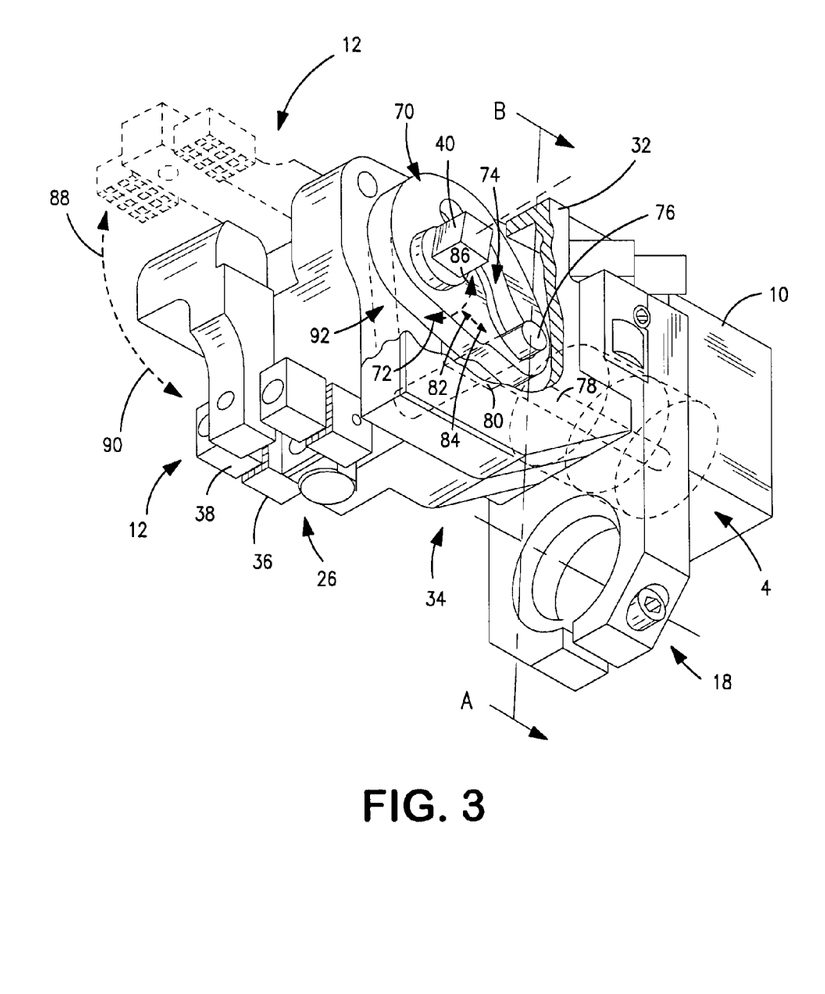
FIG. 3. is a right-upwardly perspective and partially cut-way view of the fluid actuated clamp of FIG. 1.

A perspective view of the fluid actuated clamp 2 with a portion of housing portion 32 cutaway is shown in FIG. 3. In the illustrated embodiment, a body, illustratively a cam member 70, is located within housing portion 32. Hub 40 is disposed through cam member 70. Because hub 40 is coupled to member 70, it will move as member 70 moves. For example, as cam member 70 is rotated in direction 72, so too does hub 40. As illustratively shown, cam member 70 comprises a cam track 74. In the illustrated embodiment, cam track 74 is arcuate. It is appreciated, however, that the shape and path of track 74 can be of any variety depending on the configuration of the cam member and desired travel of the jaws members.

A portion of cam pin 76 is disposed through cam track 74. Cam pin 76 is also coupled to piston rod 78 at coupling 80. (See also FIG. 4.) Fluid actuator 4 is, illustratively, configured to move piston rod 78 in a linearly reciprocal motion, directions 82, 84, for example. Illustratively, cam member 70 is movable in arcuate directions 72, 86 in a plane parallel to the plane with which piston rod 78 moves. In the illustrated embodiment, as piston rod 78 moves in direction 82, its coupling to cam pin 76 causes same to travel along track 74, causing cam member 70 to move rotationally in direction 72. Movement of cam member 70 consequently moves arm assembly 12 in direction 88. This movement in direction 88 locates arm assembly 12 in the open position. The rotated position of cam member 70 is shown in phantom lines indicated by reference numeral 92. Conversely, as piston rod 78 moves in direction 84, its coupling to cam pin 76 causes same to travel along the path of track 74, which causes cam member 70 to move rotationally in direction 86. Movement of cam member 70 consequently moves arm assembly 12 in direction 90. This movement in direction 90 locates arm assembly 12 in the closed or clamped position, similar to that shown in FIG. 1. It is contemplated that the exact paths and operations recited above are for illustrative purposes and are not to be construed as contemplation of only a single restrictive embodiment.

Figure 4:
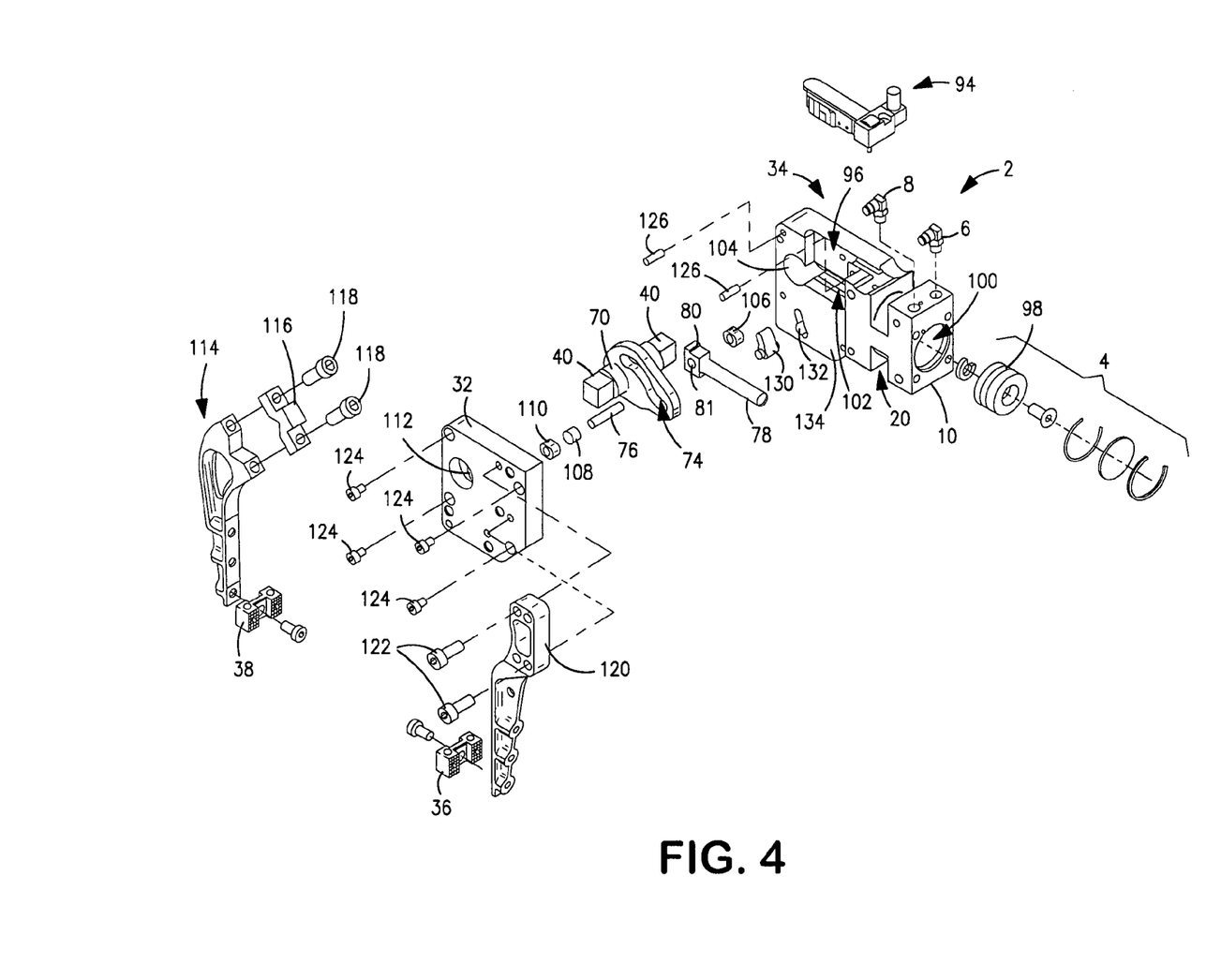
FIG. 4 is an exploded perspective view of the fluid actuated clamp of FIG. 1 with an alternative set of illustrative jaw members.

An exploded view of clamp assembly 2 is shown in FIG. 4. In this illustrative embodiment, housing portion 32 is separated from housing 34, revealing the detail of the assembly. A switch or sensor assembly 94 of the type configured for use in such clamp assemblies is, illustratively, configured to be located in a cavity 96 located in housing 34 for detecting the mechanisms within. In this illustrative embodiment, fluid ports 6, 8 are located on body 10 on the same side relative to mounting bracket 14. This is just an illustrative arrangement, however. Ports 6, 8 do serve to supply fluid to power actuator 4 which is illustratively a piston 98. Including associated fasteners and seals, actuator 4 is disposed in a cavity 100 located in body 10 and is in operative communication with piston rod 78 moving same.

A cavity 102 and associated bore 104 are disposed in housing 34. Illustratively, piston rod 78 is located in, and movable relative to, cavity 102. A bore 81 disposed through coupling 80 receives cam pin 76 which extends therethrough, and illustratively couples to a bushing 106 for assistance in sliding within cavity 102. Hub 40 extends into bore 104. Illustratively, a roller 108 is disposed on cam pin 76, and is positioned such that as cam pin 76 is disposed through cam track 74 of cam member 70, roller 108 provides a friction-reduced contact between cam pin 76 and cam track 74. Also located opposite to bushing 106 on cam pin 76 is bushing 110. Bushing 110 is illustratively located in cavity 112 which is illustratively disposed in housing portion 32. (See also FIG. 7.) An illustrative stop 130 which is positioned in a stop locator 132 illustratively disposed in face 134 of housing 34.

Cavity 112 is shown disposed through housing portion 32 for receiving hub 40. When assembled, hub 40 extends through cavity 112, allowing attachment of a clamp jaw, illustratively jaw 114, shown in FIG. 4. In this illustrative embodiment, clamp jaw arm 114 is attached to hub 40 via brackets 116 and fasteners 118. As cam member 70 rotates, so too will clamp arm 114. Also shown is second clamp arm 120, illustratively attached to housing portion 34 via fasteners 122. Housing portion 32 is attached to housing 34 via fasteners 124. Additionally, illustrative housing locators 126 are partially disposed in a portion of housing 34, and configured to assist in proper mating between housing 34 and housing portion 32.

Figure 5:
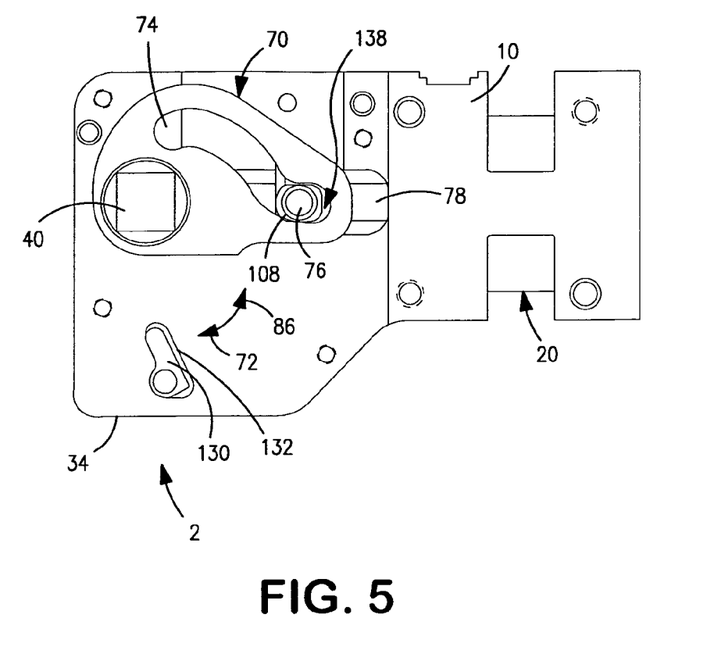
FIG. 5 is a side-sectional view of the fluid actuated clamp of FIG. 1 showing a cam and cam pin located in one position.
Figure 6:
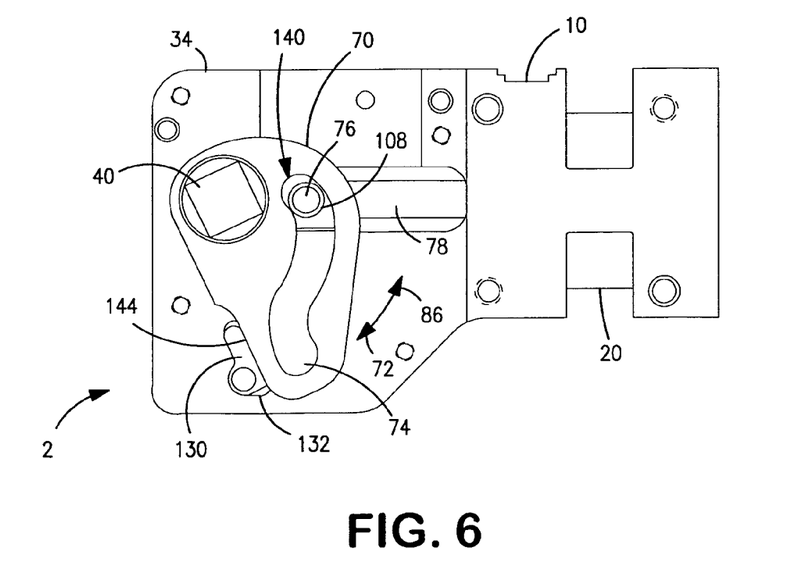
FIG. 6 is another side-sectional view of the fluid actuated clamp of FIG. 1 showing the cam and cam pin located in a second position.
Figure 7:
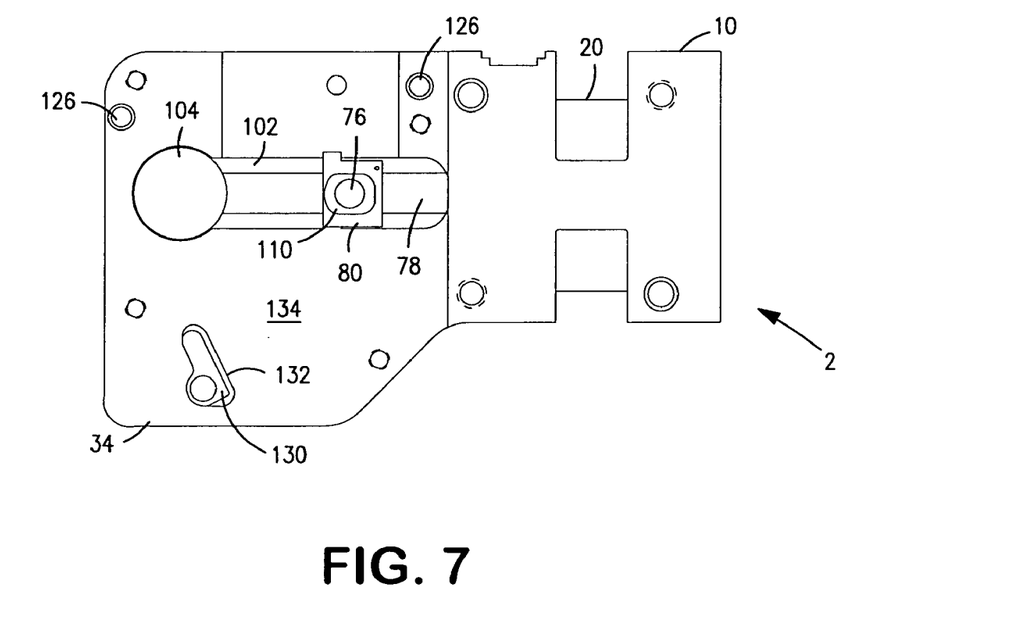
FIG. 7 is side-sectional view similar to FIGS. 5 and 6 with the cam member removed.
Figure 8A:
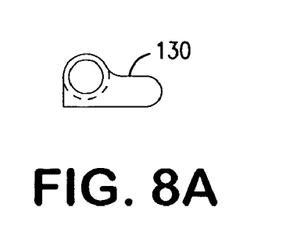
FIGS. 8a through d are various views of a cam member stop also shown in FIGS. 5 through 6.
Figure 8B:
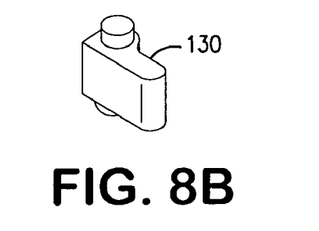
Figure 8C:
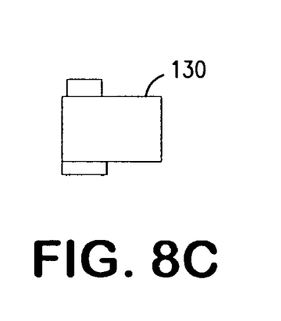
Figure 8D:
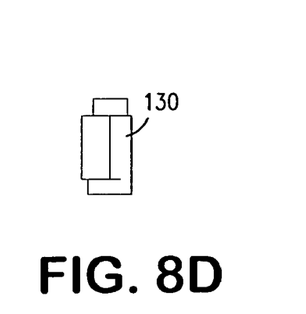

Sectional views of the fluid actuated clamp 2 are shown in FIGS. 5, 6, and 7, showing cam member 70 located in different positions. Illustratively, FIG. 5 shows piston rod 78 in a retracted position with cam pin 76 and roller 108 located at a proximal end 138 of cam track 74. In one illustrative embodiment, cam member 70 is located in such a position that any clamp jaw member attached to hub 40 would be correspondingly located in the closed or clamped position. Conversely, with piston rod 78 shown located in an extended position in FIG. 6, cam pin 76 and roller 108 are located at a distal end 140 of cam track 74. In this illustrative embodiment, cam member 70 is located in such a position that any clamp jaw member attached to hub 40 would be correspondingly located in the open position. It is appreciated that clamp 2 may be so configured to operate such that movements of a cam member such as that described herein will produce opposite results with respect to the jaw members opening and closing.

The illustrated embodiment in FIG. 6 also shows stop 130 limiting the movement of cam member 70 in direction 72. Stop 130 illustratively engages a surface portion 144 of cam member 70 to limit its movement. Illustratively, stop 130 limits the extent a clamp jaw member can open. It is appreciated that stop 130 and stop locator 132 may be located anywhere relative to a cam member such that the same is restricted in movement as desired by an operator. An embodiment of stop 130 is shown in FIGS. 8a through d. It is appreciated that the configuration of the stop is for illustrative purposes only, and can be of any configuration suited to limit movement of a jaw assembly.

Figure 9:
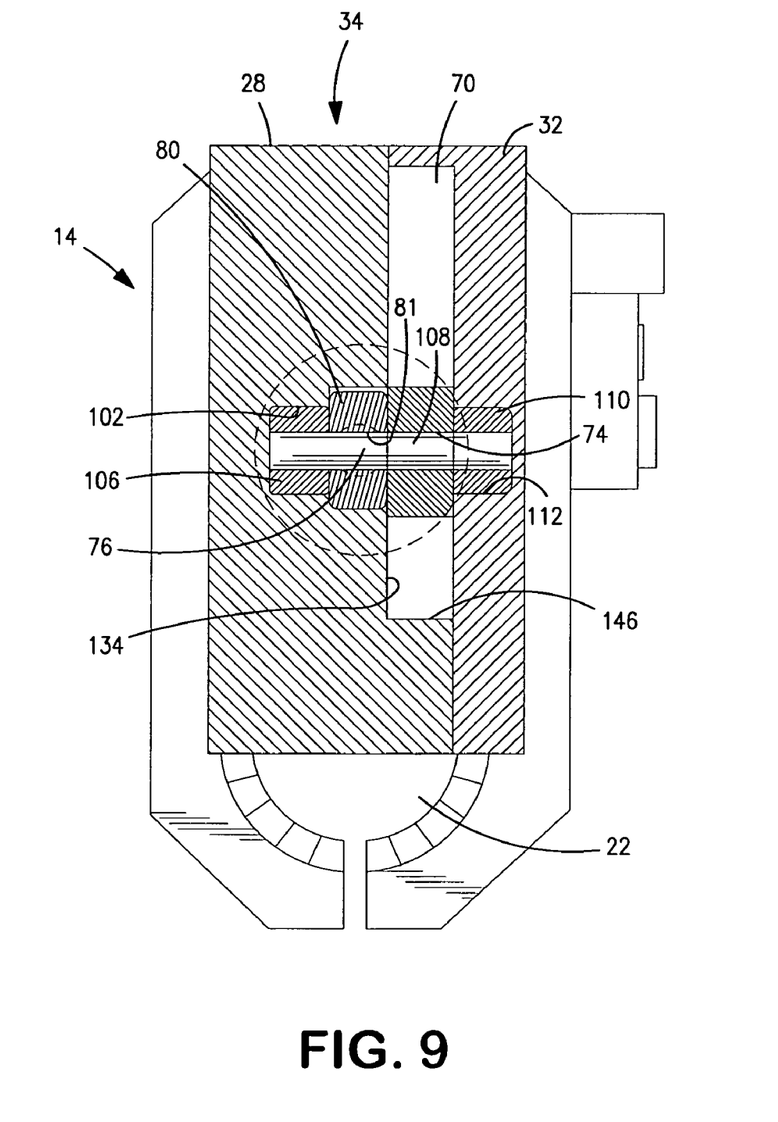
FIG. 9 is a front cross-sectional view of the fluid actuated clamp of FIG. 1.

A front cross-sectional view of the fluid actuated clamp 2 is shown in FIG. 9. Cam member 70 is illustratively located within a chamber 146, which is illustratively formed between housing portions 28 and 32. Cam pin 76 is shown disposed through track 74 of cam member 70, coupling 80, roller 108 and bushings 106, 110 located in cavities 102, 112, respectively.

Figure 10:
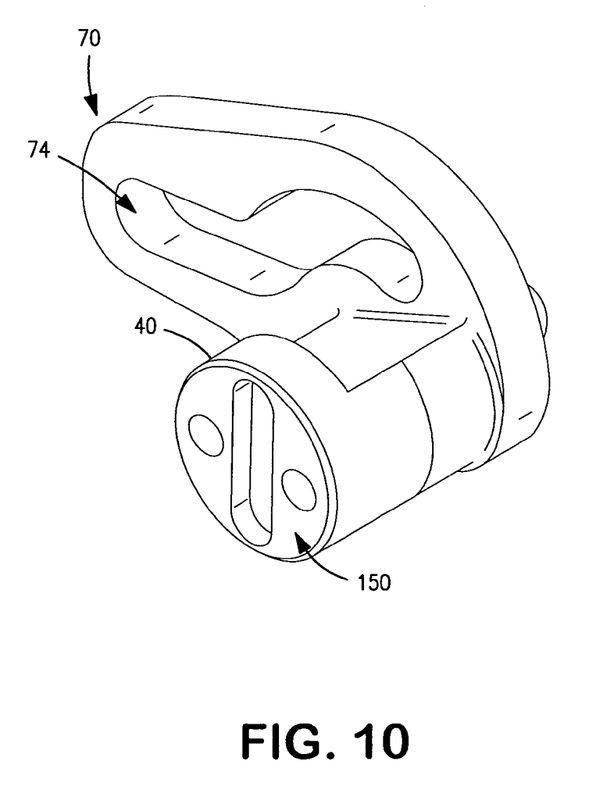
FIG. 10 is a perspective view of an illustrative cam member.

A perspective view of an illustrative cam member 70 is shown in FIG. 10. Cam member 70 comprises a cam track 74 having an alterative configuration from the cam track of the previous embodiment. This cam member 70 also comprises a hub 40, also of an alternative configuration from that of the previous embodiment. It is herein appreciated that attachment surface 150 is illustratively configured to receive a clamp arm of any appropriate variety.

Although the present disclosure has been described with reference to particular means, materials and embodiments, from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. An actuated workpiece clamp comprising:
   an actuator;
   a body;
   a linkage disposed in the body and coupled to the actuator for longitudinal movement within the body;
   a cam member having a cam track disposed therein and a pivot member extending therefrom;
   wherein the cam member is rotatable about an axis disposed through the pivot member;
   a cam pin coupled to the linkage and disposed in the cam track;
   at least one jaw member, a portion of which is attached to the pivot member external to the body;
   wherein longitudinal movement of the linkage causes movement of the cam pin along the cam track to cause pivoting of the cam member about the axis disposed through the pivot member which pivots the portion of the jaw member about the axis disposed through the pivot member external of the body; and
   a housing that attaches to the body and encloses the cam member.

2. The actuated workpiece clamp of claim 1, wherein the at least one jaw member is a plurality of jaw members at least one of which is fixedly attached to the body.

3. The actuated workpiece clamp of claim 1, further comprising a stop that couples to the body and selectively engages the cam member to limit pivoting of same to a defined stroke.

4. The actuated workpiece clamp of claim 1, wherein the at least one jaw member is a plurality of jaw members at least one of which is a pivot jaw member, pivotably attached to the body independent of the cam member.

5. The actuated workpiece clamp of claim 1, wherein the cam track is arcuate.

6. The actuated workpiece clamp of claim 1, wherein the linkage is attached to a piston rod extending from the actuator.

7. The actuated workpiece clamp of claim 1, wherein the linkage is movable longitudinally in a first plane, and the cam member is pivotable in a second plane which is spaced apart from and substantially parallel to the first plane.

8. The actuated workpiece clamp of claim 1, wherein the one jaw member which is fixedly attached to the body is attached to the housing.

9. An actuated workpiece clamp comprising:
   a coupling;
   a member attached to the coupling and extending therefrom;
   a movable body having an arcuate slot disposed therethrough
   a pivot coupling attached to the movable body;
   wherein the member engages the arcuate slot to pivot the movable body about the pivot coupling; and
   a housing enclosing the coupling, the member, and the movable body, having an opening disposed therein to allow the pivot coupling to extend therethrough; and
   a jaw attached to the pivot coupling and located exteriorly of the housing, and is movable relative to the housing; and
   a jaw pivotably attached to the housing independent of the movable body.

10. The actuated workpiece clamp of claim 9, further comprising a stop positioned within the housing that selectively engages the movable body to limit pivoting of same to a defined stroke.

11. The actuated workpiece clamp of claim 9, wherein the coupling and member are movable longitudinally in a first plane, and the movable body is pivotable in a second plane which is spaced apart from and substantially parallel to the first plane.

12. An actuated workpiece clamp comprising;
   an actuator;
   a body;
   a linkage disposed in the body and coupled to the actuator for longitudinal movement within the body;
   a cam member having a cam track disposed therein and a pivot mounting extending therefrom;
   wherein the cam member is rotatable about an axis disposed through the pivot mounting;
   a cam pin coupled to the linkage and disposed in the cam track;
   at least one jaw member, a portion of which is attached to the pivot mounting and located external to the body;
   at least one pivot jaw, pivotably attached to the body independent of the cam member;
   wherein longitudinal movement of the linkage causes movement of the cam pin along the cam track to cause pivoting of the cam member about the axis disposed through the pivot mounting which pivots the portion of the jaw member about the axis disposed through the pivot mounting external of the body; and
   a housing coupled to the body;
   wherein the housing encloses the cam member; and
   wherein the at least one jaw member is located exterior of the housing.

* * * * *